United States Patent [19]
Pera

[11] 3,791,672
[45] Feb. 12, 1974

[54] FOLDING BICYCLE
[75] Inventor: Warren K. Pera, Oakland, Calif.
[73] Assignee: Bell Fold-A-Bike, Inc., Orinda, Calif.
[22] Filed: Nov. 10, 1972
[21] Appl. No.: 305,611

[52] U.S. Cl. ............................................. 280/287
[51] Int. Cl. ............................................ B62k 3/04
[58] Field of Search ............................ 280/287, 278

[56] References Cited
UNITED STATES PATENTS

| | | | |
|---|---|---|---|
| 561,665 | 6/1896 | Hubbell | 280/287 X |
| 578,921 | 3/1897 | Guy | 280/287 X |
| 2,359,764 | 10/1944 | Johnson | 280/287 X |

*Primary Examiner*—Richard A. Schacher
*Attorney, Agent, or Firm*—Julian Caplan

[57] ABSTRACT

The frame of a bicycle is provided with a hinge on the top bar and a detachable joint on the diagonal bar to permit folding to reduce space for transportation and storage. So-called "10 speed" bicycles require installation of a pair of cables controlling speed changes clamped in a position extending alongside the diagonal bar and these cables must be taut when the bicycle is operative. Hence detachment of the diagonal bar and folding is prevented so long as the cables are clamped to the bar. In accordance with the present invention, the rearmost cable clamp is detachable from the diagonal bar so that the cables can bend when bar is disjointed.

9 Claims, 10 Drawing Figures

3,791,672

FOLDING BICYCLE

This invention relates to a new and improved foldable bicycle and more particularly to a so-called "10 speed" bicycle. The features of the invention may be incorporated in the bicycle at the time of original manufacture or may be used as a kit to install on a pre-existing non-folding ten speed bicycle. Folding bicycles have existed for many years, but the adaptation of folding bicycle construction to 10 speed bicycles has not heretofor been successfully achieved. Accordingly, it is the principal object of the present invention to provide a structure which enables ten speed bicycles to be folded without removing or otherwise radically altering the cables controlling the switching of the speeds each time the bicycle is folded.

A feature of the invention is the fact that the top bar of the bicycle is hinged and the bottom bar is jointed in such manner that it may be disjointed to permit folding, and this facilitates fabrication of the folding features of the bicycle. At the same time, the rigid cables which must be held in brackets to extend down the diagonal bar of the bicycle frame are held in a clamp which is removable from the diagonal bar; and when removed, permits the cables to bend as the frame of the bicycle is folded. The facility with which the cables may be disconnected from the rear clamp on the diagonal bar is one of the important features of the invention.

Another feature of the invention is the fact that it may be installed on bicycles already produced as a kit for conversion to folding principles. The ease with which the key may be used in installation and the adaptation of the kit to the differences in structure of various makes of bicycles is another feature of the invention.

The advantages of folding bicycles, as heretofore existing, have been preserved in the present invention. Thus, the bicycles may be folded for transportation and storage with very little skill required to perform the operation and without the need of special tools. The operation may be performed rapidly. When the bicycle is unfolded and is in operative position, it is unnecessary to make adjustments of the cables which govern the speed control, since such adjustments are not affected by the folding operation.

One of the principal features of the invention is the fact that cables which govern the speed control of the bicycle are temporarily displaced during folding, but the essential adjustments of these cables are not affected. It will be understood that adjustment of the speed adjusting cables is one of the difficult maintenance problems in ten speed bicycles. The present invention does not affect these adjustments nor require them to be reperformed each time the bicycle is folded and unfolded. Hence, considerable cost in maintenance of the bicycle is achieved.

Other objects of the present invention will become apparent upon reading the following specification and referring to the accompanying drawings in which similar characters of reference represent corresponding parts in each of the several views.

Figure 4:
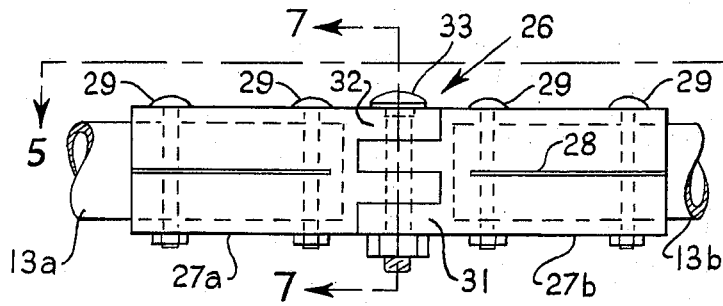
FIG. 4 is an enlarged fragmentary side elevational view of the top bar and its joints.
Figure 7:
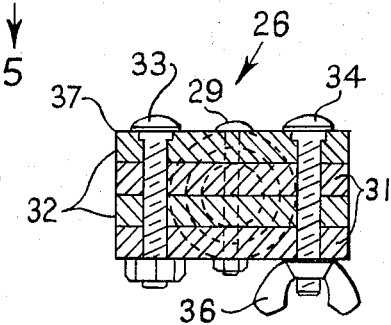
Figure 6:
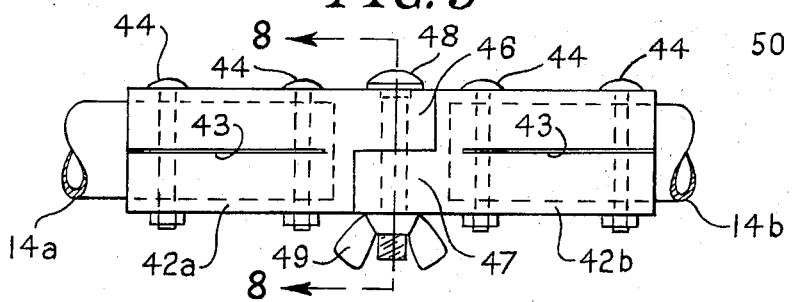
FIG. 6 is a view similar to FIG. 4 of the diagonal bar joint.
Figure 8:
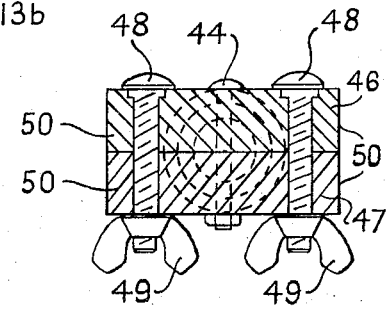

FIGS. 7 and 8 are transverse sectional views taken substantially along the line 7—7 of FIG. 4 and 8—8 of FIG. 6, respectively.

Figure 9:
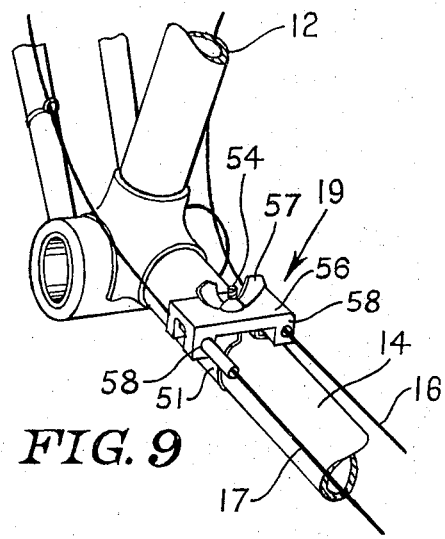

FIG. 9 is a fragmentary enlarged perspective view of the rear of the diagonal bar and associated structure.

Figure 10:
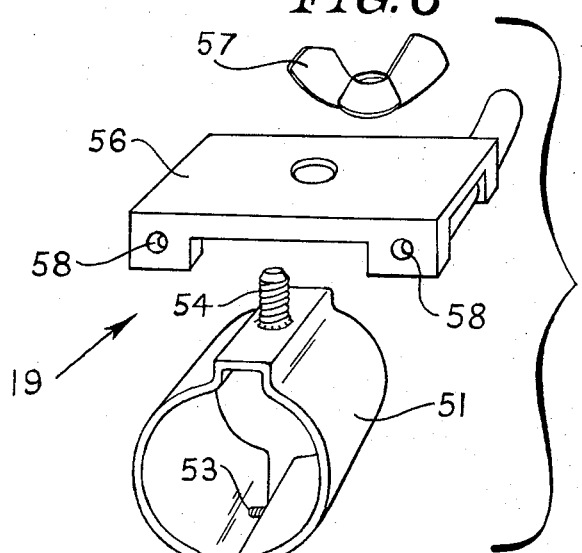

FIG. 10 is an enlarged exploded perspective view of the rear clamp for the speed adjustment cables.

Figure 1:
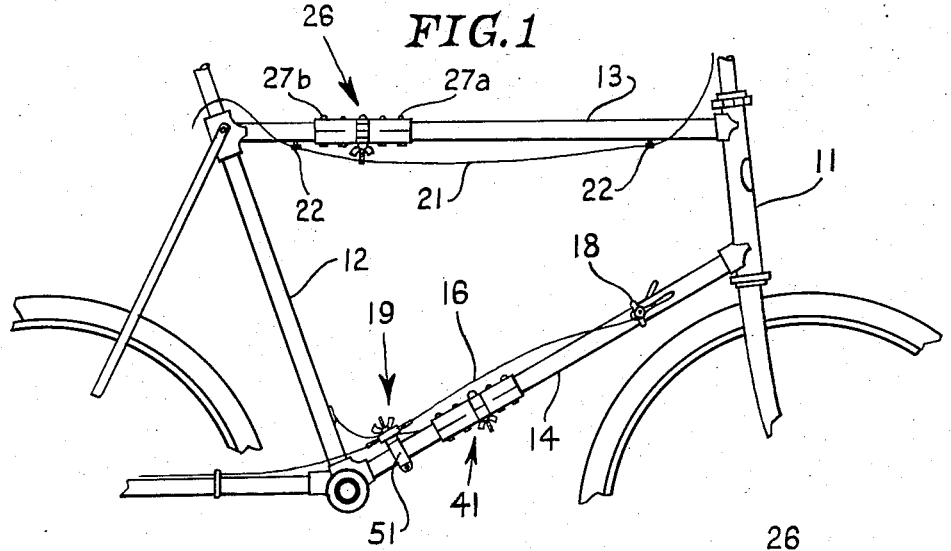
FIG. 1 is a side elevational view of the frame of a bicycle in which the present invention is installed, non-essential parts being eliminated for simplicity.

Shown in FIG. 1 are portions of the frame of a conventional ten speed bicycle, 14 being understood that the transmission, or speed adjustment features, are not shown. However, these features are well understood in this art. It will further be understood that the invention may be applied to other styles of bicycles with brake facilities, this being one of the important advantages of the invention. Hence the frame has a front post 11 and a rear frame member 12 interconnected by a top bar 13 and a diagonal bar 14, all as well understood in the bicycle art. The object of the present invention is to permit folding of the frame from the operative position of FIG. 1 through the partially folded position of FIG. 2 to the folded position of FIG. 3. One of the distinguishing features of ten speed bicycles is the use of two transmission cables 16, 17 which must be maintained taut when the bicycle is operative and which normally extend down diagonal bar 14 from a position at the top of bar 14 (not shown) of the bicycle where they are actuated by the bicyclist and extending into the transmission (also not shown) associated with the rear wheel. In order to maintain the cables 16, 17 as close as possible to the bar 14 so that there is no likelihood of snagging of the clothing of the bicyclist or other objects in the cables, there is a front clamp 18 attached to the upper end of diagonal bar 14 which receives the cable 16 and 17; and, in accordance with the present invention, a specially constructed rear clamp 19, hereinafter described in detail, which is attached adjacent the bottom of the diagonal bar 14. In addition to cables 16, 17, there is normally a rear-brake cable 21 which is suspended from the top bar 13 by means of guides 22 which extend from a brake grip (not shown) on the handle bars to a brake (also not shown) which engages the rear wheel. By reason of the fact that the top bar 13 is hinged rather than disjointed during the folding operation and also because the cable 21 is not necessarily held as taut as cables 16 and 17, it is unnecessary to have special guides or clamps for the cable 21, thereby distinguishing from the cables 16 and 17 and their supports.

Figure 5:
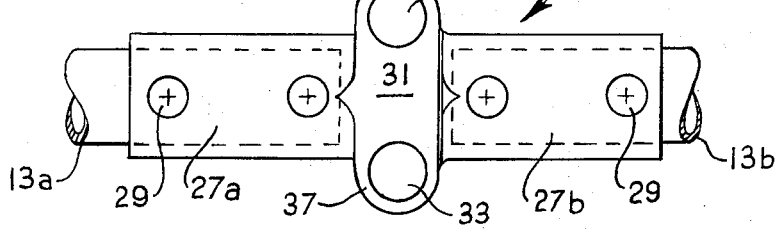
FIG. 5 is a top plan of the subject of FIG. 4.

The top bar 13 of the bicycle is divided into two sections — a rear section 13a and a front section 13b. Such sections may be initially fabricated as part of the bicycle as originally manufactured, or the bar 13 originally installed may be cut to provide these two sections. Top bar hinge 26 slips over the sections 13a, 13b. For this purpose at either end of hinge 26 is a sleeve 27a, 27b which is formed with a slot 28 to accommodate variations in diameter of bar 13a, 13b. Further, shims (not shown) may be installed inside these sleeves 27a, 27b to make the hinge 26 adaptable to smaller sizes of top bars. To secure the sleeves 27a, 27b in place, bolts 29 pass through holes in the sleeves and also through holes drilled in the top bar sections 13a, 13b. The sleeves 27a, 27b thus clamp securely the top bar sections 13a, 13b. The hinge 26 has a plurality of leaves, namely, rear leaves 31 and front leaves 32 which are integral with the sleeves 27b and 27a, respectively. As best shown in FIG. 7, these leaves interfit to provide a hinge for the top bar. As best shown in FIGS. 5 and 7, the leaves have ears 37 projecting laterally from either side. A pivot bolt 33 passes through aligned holes in the ears 37 of leaves 31, 32. On the opposite side there is a removable bolt 34 which passes through similar holes in the leaves and is secured by a wing nut 36. When the bicycle is to be folded, the nut 36 is removed and then the bolt 34 is withdrawn and this permits the leaves 31, 32 to pivot around bolt 33.

Figure 2:
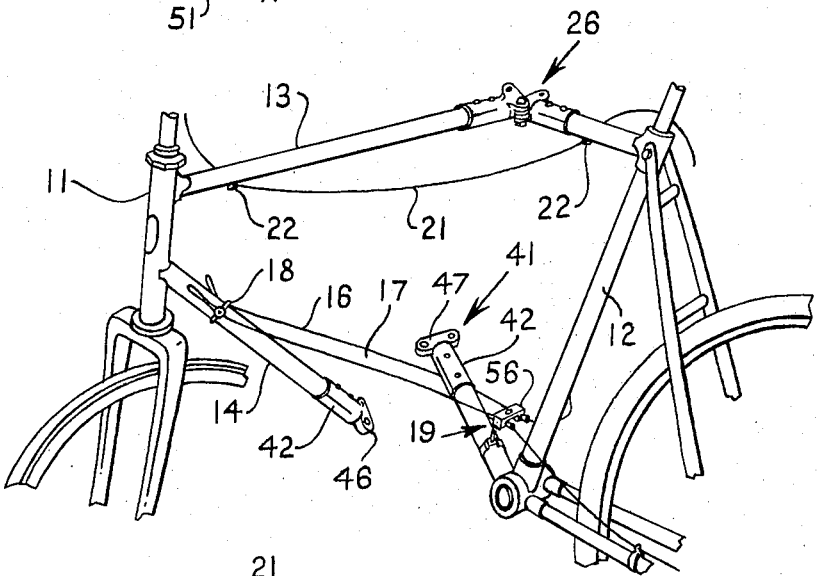
FIG. 2 is a side elevational view from the opposite side of FIG. 1 showing the bicycle partially folded.
Figure 3:
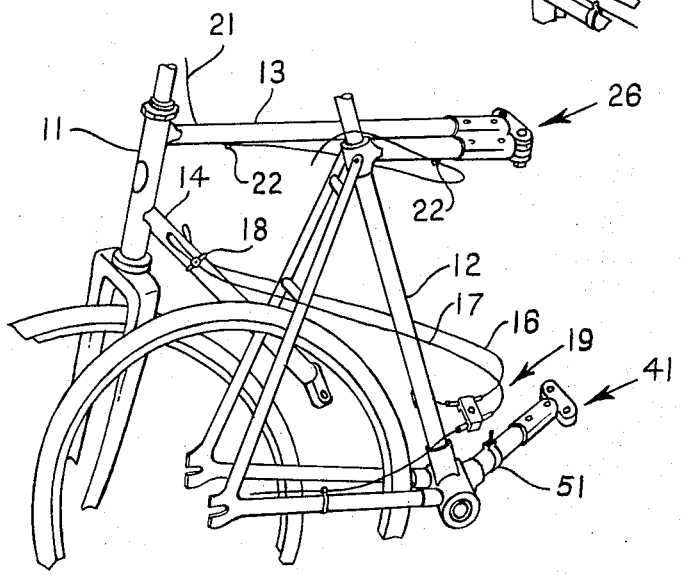
FIG. 3 is a side elevational view similar to FIG. 2 showing the bicycle completely folded.

Diagonal bar 14 is also either initially or subsequently formed in two parts 14a, 14b as best shown in FIG. 6. Diagonal bar joint 41 has a pair of sleeves 42a, 42b which encircle the abutting ends of bar section 14a, 14b, respectively. Sleeves 42a, 42b are formed with slots 43 similar to the slots 28 and are secured by bolts 44 similar to the bolts 29 which pass through holes in the sleeves and in the bar section. Again, shims (not shown) may be used to further facilitate adaptability of the sleeves to different sizes of bars. The joint 41 consists of a top leaf 46 and a bottom leaf 47 having projecting ears 50 similar to the ears 37. Two removable bolts 48 pass through aligned holes in the ear 50 of the leaves 46, 47 and are secured in position by wing nuts 49. When the bicycle is to be folded, the nuts 49 are unthreaded and the bolts 48 removed, permitting the joint 41 to be separated as is shown in FIGS. 2 and 3 and as distinguished from the hinging of the joint 26.

By reason of the fact that the joint 41 separates, and in view of the fact that cables 16 and 17 must remain taut, the rear clamp 19 for said cables is made detachable. As best shown in FIGS. 9 and 10, clamp 19 consists of a split sleeve 51 which is slipped over the rear of diagonal bar 14. Flanges 52 on sleeve 51 are drawn together by means of bolts 53 to secure the clamp in place. Sleeve 51 is provided with an upward extending threaded stud 54. Detachable from sleeve 51 is a block 56 which is apertured to receive stud 54 to secure the block 56 in place. Block 56 is formed with aligned pairs of guide holes 58 through which the cables 16, 17 pass. In normal operation of the bicycle, the block 56 is held in place. However, preliminary to folding, the nut 57 is removed permitting the block 56 to be removed and this enables the cables 16, 17 to fold, as best shown in FIG. 3.

To summarize the use of the device, assuming that the invention is installed as a piece of original equipment, the bars 13 and 14 are initially fabricated in two sections and the top bar 26 and diagonal bar joint 41 installed initially. On the other hand, the members may be installed as a kit on existing bicycles. In such instances, the bars 13 and 14 are cut, a sufficient amount of material being removed to accommodate the space occupied by the leaves 31, 32 or 46, 47. The sleeve 51 of clamp 19 is applied and the cables 16, 17 are disconnected from the speed adjusting transmission or from the handle grip (whichever is more convenient) and inserted through the guide holes 58 of block 56. It is only necessary to insert the cables in the initial installation and it is not necessary to disconnect the cables 16, 17 thereafter.

In use, the wing nuts 36 and 49 are removed and the bolts 34 and 48, are removed. Either at this time or after the folding of the bicycle is partially completed, the nut 57 is removed and the block 56 slipped off of the stud 54. The top bar hinge 26 pivots around the bolt 33 (which remains in place) while the joint 41 is separated. This permits the bicycle to fold to the folded position shown in FIG. 3, the cables 16, 17 bending simultaneously therewith. As has previously been mentioned, the cable 21 also bends but it is not necessary to remove either of the guides 22 to permit such bending.

Unfolding and assembly of the bicycle in operative position is readily accomplished by reversal of the foregoing steps.

What is claimed is:

1. A foldable ten-speed bicycle comprising a foldable frame having a top bar and a diagonal bar, a hinge in one of said bars, first detachable means to hold said hinge inoperative while said bicycle is operative, a disjointable joint in the other of said bars, second detachable means to hold said joint assembled while said bicycle is operative, first and second gear change cables extending along said diagonal bar when said bicycle is operative, a first clamp and a second clamp, each said clamp engaging said diagonal bar and also receiving and guiding said cables, said second clamp having a bar engaging portion, a cable engaging portion and third detachable means securing said portions together, whereby upon detachment of said detachable means said cable engaging portion may be removed from said bar engaging portion to permit bending of said cables when said frame is folded.

2. A bicycle according to claim 1 in which said hinge comprises first and second sleeves shaped to fit over adjacent ends of said one of said bars, means to fix said sleeves on to said ends, and overlapping leaves, some of said leaves fixed to said sleeves, others of said leaves fixed to the other of said sleeves and a pivot pivoting said leaves together.

3. A bicycle according to claim 2 in which said first detachable means comprises a bolt fitting through said overlapping leaves and preventing pivoting of said hinge.

4. A bicycle according to claim 2 in which said sleeves are adjustable in size to accommodate different size bars.

5. A bicycle according to claim 1 in which said disjointable joint comprises first and second sleeves shaped to fit over adjacent ends of said other of said bars, means to fix said sleeves onto said ends, and overlapping leaves, one fixed to said first sleeve and the other to said second sleeve.

6. A bicycle according to claim 1 wherein said bar engaging portion of said clamp comprises a split sleeve shaped to fit over said diagonal bar, means for tightening said split sleeve on said bar and a stud, said cable engaging portion having a plate apertured to receive said stud and formed with guide holes to receive said cables.

7. A kit to convert a conventional 10-speed bicycle to a folding bicycle, said bicycle having a top bar, a diagonal bar and two speed change cables along said diagonal bar and wherein both said bars are severed preliminary to installation of said kit, said kit comprising a hinge having a first sleeve shaped to fit over one severed end of one of said bars, a first leaf fixed to said first sleeve, a second sleeve shaped to fit on one of said bars, a second leaf fixed to said second sleeve, a pivot pivoting said first and second leaves together, first detachable means to hold said first and second leaves fixed together; a disjointable joint having a third sleeve shaped to fit over the severed end of one of said bars, a third leaf fixed to said third sleeve, a fourth sleeve shaped to fit over the severed end of one of said bars, a fourth leaf fixed to said fourth sleeve, second detachable means to hold said third and fourth leaves together; and a cable engaging clamp having a bar engaging first portion, a second portion for engaging both said cables and third detachable means for holding said portions together.

8. A kit according to claim 7 in which at least some of said sleeves are adjustable in size to accommodate different size bars.

9. A kit according to claim 7 wherein said first portion comprises a split fifth sleeve shaped to fit over one said bar, means for tightening said fifth sleeve on said bar and a stud, said second portion comprising a plate apertured to receive said stud and said third detachable means engages said stud.

* * * * *